Jan. 31, 1967    S. G. SIDDALL    3,300,881
REVERSIBLE SNOW PLOWS
Filed July 15, 1964    2 Sheets-Sheet 2
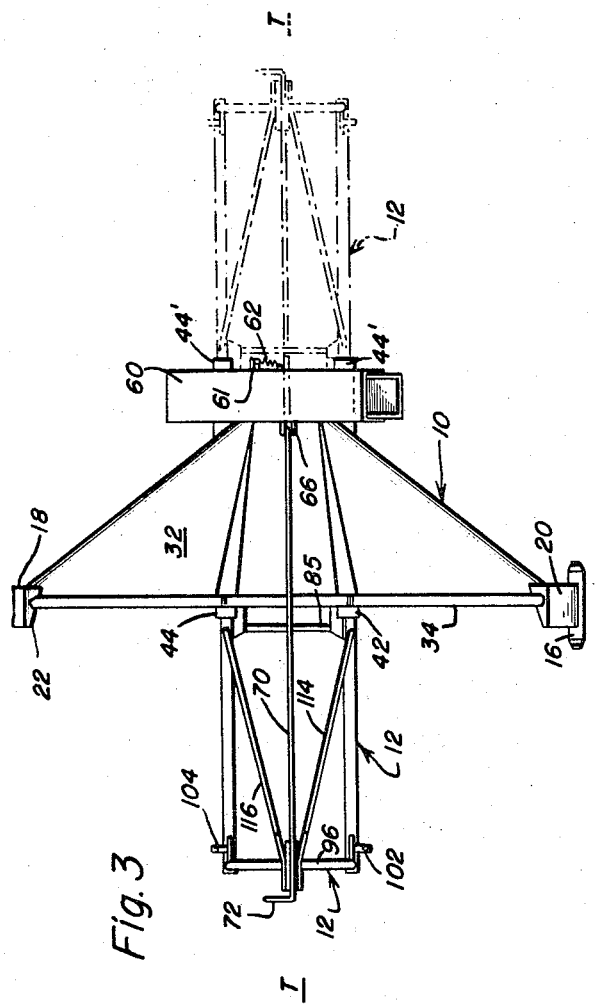
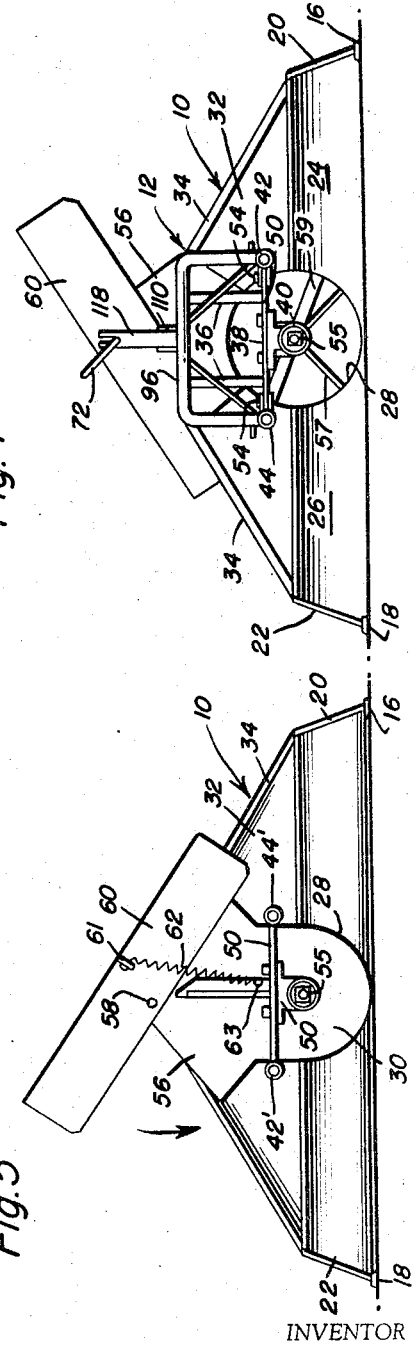
INVENTOR
Stanley G. Siddall
BY Frederick C. Bromley
ATTORNEY

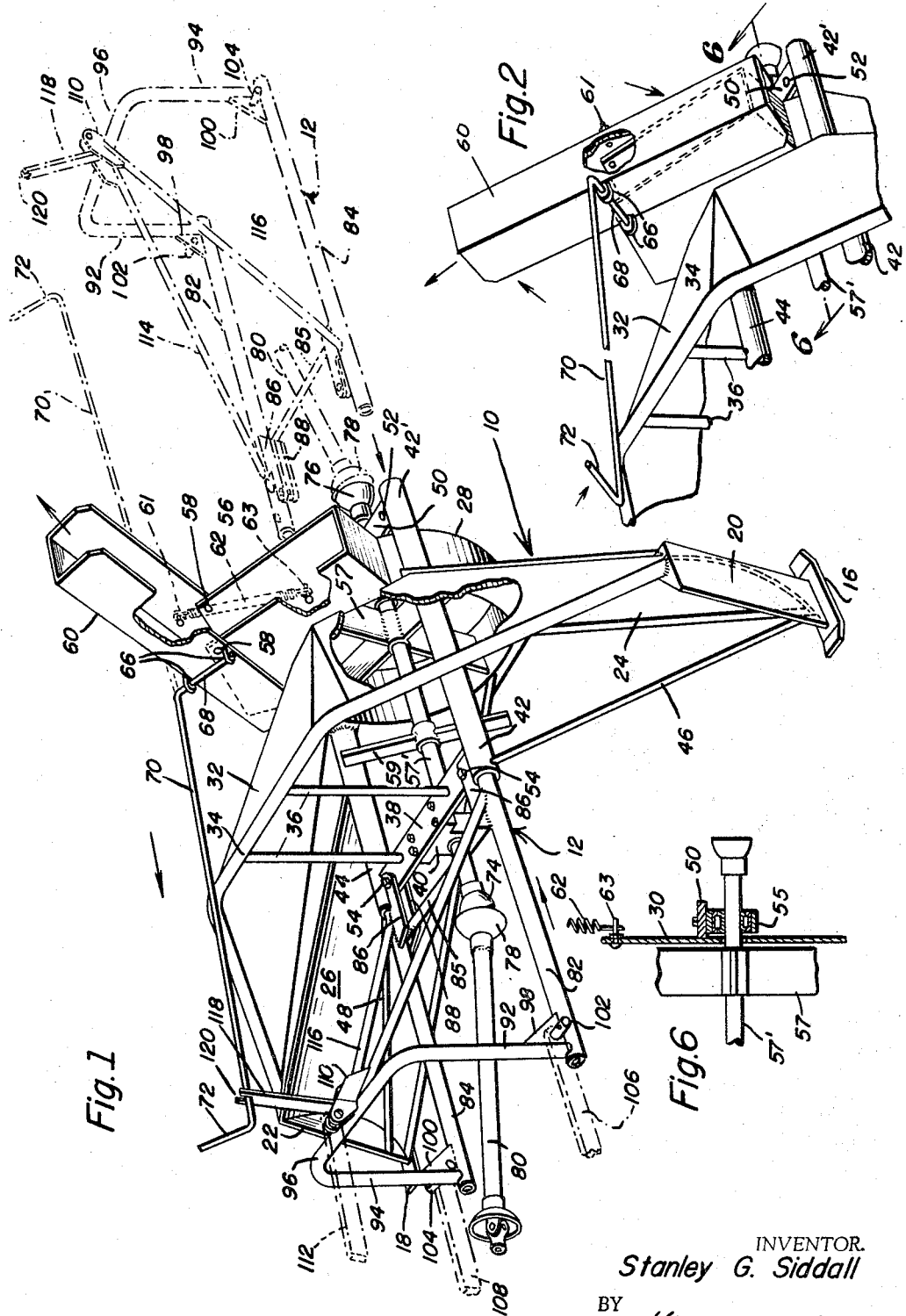

United States Patent Office 3,300,881
Patented Jan. 31, 1967

3,300,881
REVERSIBLE SNOW PLOWS
Stanley G. Siddall, Box 368, Orangeville
Ontario, Canada
Filed July 15, 1964, Ser. No. 382,700
5 Claims. (Cl. 37—43)

This invention relates generally to apparatus for moving snow, etc. and is more particularly directed to a snow plow which includes means for operating the plow by either pulling or pushing the plow at the rear of a draft vehicle.

The present invention is related to the type of apparatus disclosed in United States Letters Patent to Ingbritson, 2,733,524. In this prior art a plow is mounted to a rear tractor lift and the draft vehicle is driven rearwardly, i.e. so the draft vehicle does not have to first pass over the material which is subsequently to be moved. The reverse operation of the draft vehicle is desirable under certain circumstances, however, there generally is only a single gear ratio in a reverse direction, and thus this attitude of operation has its limitations.

The draft vehicle has generally at least three and possibly more forward speeds, and thus where the material being plowed is not heavy and impacted, it is desirable to operate in a forward or the normal direction of operation, particularly to attain greater clearing speeds, etc.

Primary objects of the present invention are to provide a novel snow plow attachment which permit reversal of the direction of the draft vehicle; to provide particularly a novel adaptor frame which enables the plow to be pulled or pushed at the option of the operator; to provide an adaptor frame which permits a power-operated snow plow to be operated either by pushing or pulling by the draft and power-supplying vehicle; to provide a novel attachment which is relatively simple and rugged in construction, which is readily adapted for use on conventional draft vehicles, which is readily installed and used by relatively unskilled personnel.

These, together with other and more specific objects, will become more apparent from a consideration of the following description and the accompanying drawing forming a part thereof, wherein, in the drawing:

FIG. 1 is a perspective view of a snow plow including a frame accommodating the plow on an adaptor frame which will permit optional pushing or pulling of the plow, and having parts broken away for purposes of clarity and showing the alternate position of the adaptor frame by means of phantom lines;

FIG. 2 is a fragmentary perspective view showing the alternate position of the discharge spout or baffle for the discharge opening of the plow housing;

FIG. 3 is a reduced scale top plan view of the plow and adaptor frame, and showing the adaptor frame in phantom lines for operating the plow in a reverse direction;

FIG. 4 is a reduced scale front elevation of FIG. 1;

FIG. 5 is a reduced scale rear elevation of FIG. 1; and

FIG. 6 is a fragmentary vertical section taken substantially on the plane of line 6—6 of FIG. 2, and showing details of the rear bearing for the power shaft of the blower blade of the plow.

Referring to the drawing in detail, and first considering FIG. 1, a snow plow is indicated generally at 10 and is mounted on a tractor T (see FIG. 3) by means of an adaptor frame indicated generally at 12.

The plow 10 comprises a pair of spaced skids 16 and 18 integral with vertical side plates 20 and 22 respectively disposed at the ends of converging scraper blades 24 and 26 which form a broad throat converging at a cylindrical barrel 28 having a black plate 30. The blades 24 and 26 are integral with an upper housing portion 32 having a relatively rigid frame 34 from which a pair of braces 36 depend having secured to the lower end thereof a transverse plate 38 to which a bearing block 40 is suitably secured.

The plate 38 is secured at opposite ends of a pair of mutually parallel sleeves 42 and 44 which extend beyond the back plate 30. The sleeves 42 and 44 have extending from the ends thereof to the skids 16 and 18 an angular arrangement of brace rods 46 and 48, respectively. A transverse plate 50, similar to plate 38, is secured at opposite ends to the sleeves 42 and 44. The plates 38 and 50 each include, adjacent the sleeves 42 and 44, transverse apertures 52 for receiving bolts 54 as most clearly seen in FIG. 1.

The plate 50 has secured thereto in depending relationship a bearing block 55 disposed in coaxial relation to block 40, and journalled in the bearing blocks 40 and 55 is a rotor shaft 57'.

The cylindrical barrel 28 communicates with an upper outlet 56 formed by a pair of spaced plates which includes converging upper edges as seen in FIG. 1. Pivotally mounted at 58 is a spout or baffle element which can be adjusted to direct snow, etc. toward one side or the other of the plow, and will be positioned to the side facilitating lateral casting of material toward the direction in which the rotary blade 57 will rotate depending on whether the plow is being pulled or pushed. The blade 57, is of the rotary impeller type, and is disposed in the cylindrical housing and snow will be directed thereto by the converging plow housing. Mounted on the shaft 57' forwardly of the blade 57 is a breaker bar 59 for aiding in breaking up large lumps of snow, etc. The baffle element 60 has anchored thereto one end 61 of a toggle spring 62 which is anchored at its other end 63 on the plate 30. The spring 62 will be subject to increased tension when the baffle element 60 is pivoted as will be described, this resulting in the element 60 being retained in the adjusted positions.

Opposite the spring 62, on the side 64 of element 60, are vertically spaced, apertured ear or lug elements 66 having journalled therein the angular end portion 68 of an elongated control rod 70 having a terminal handle portion 72. Rotation of the handle 72 clockwise, i.e. toward the right, about the axis of the control rod 70, will cause the baffle element 60 to be pivoted from the position shown in FIG. 1 to that shown in FIG. 2. The toggle spring 62 will maintain the adjusted position of the baffle and the direction snow is being cast will determine the side toward which the baffle will be directed. The shaft 57' includes at opposite ends thereof universal joint assemblies 74 and 76 for connection to the co-operating part 78 of a power shaft 80 from the draft and power-supplying tractor (not shown).

The type of plow involved is of the general character disclosed in United States Letters Patent to Berger, 2,679,-702, or Ingbritson, 2,733,524, which also disclose the manner in which snow plows of this general character are mounted on a "three-point" lift or hitch of a tractor vehicle to be power-operated by the same.

The adaptor frame 12 facilitates ready mounting of the plow at the rear of the tractor vehicle whereby the plow can be either pulled or pushed by driving the tractor forwardly or backwardly, the reverse drive being highly advantageous as in the case of moving the plow for operation in relatively high drifts of snow, etc.

The adaptor frame 12 comprises a pair of tubular side bars 82 and 84 which telescopically engage the terminal ends of sleeves 42 and 44, respectively. The sleeves 82 and 84 have extending transversely between the end engaging sleeves 42 and 44 a brace bar 85, and fixed thereto inwardly of the sleeves 82 and 84 are vertically spaced mounting plates 86 and 88. The plates 86, 88 include transverse apertures alignable with the apertures 52 in plate 38 or 50 for receiving therein the mounting bolts 54.

Fixed at the other end of the sleeves 82 and 84 are the lower ends of legs 90 and 92, respectively of a U-shaped frame including a transverse bight portion 96. Secured at the juncture of the legs 90, 92 and sleeves 82, 84, respectively are gusset plates 98 and 100 which respectively have extending laterally therefrom mounting trunions or pins 102 and 104, respectively for engaging the transversely apertured ends of the conventional lift bars 106 and 108; fragmentary end portions thereof being shown by phantom line in FIG. 1.

The bight portion 96 of the U-shaped frame has secured thereto a coupler 110 comprising a pair of transversely apertured plates engageable with the apertured ends of a link 112 connected to the tractor power lift (not shown). The frame 12 includes angularly related brace rods 114 and 116 depending from the coupler 110 and secure at the lower ends thereof adjacent plates 86 and 88. Projecting vertically from the coupler 110 is a support element 118 which includes an upwardly opening notch 120 receiving a portion of rod 70 therein.

Use and operation

Normal use of the plow 10 will consist of the tractor vehicle dragging the plow in the direction shown by the arrow on FIG. 1, i.e. toward the left. The tractor lift link 112 will be connected to coupler 110 and the lift bars 106 and 108 will be respectively connected to trunions 102 and 104. The power shaft 80 will be connected to the universal joint assembly 74 and all of the forward speeds of the tractor can be used depending upon the conditions encountered.

In the event high drifting or deep snow is to be encountered, the tractor vehicle would become impacted or stalled before any snow is plowed. In this event, the bolts 54 are removed and the part 78 is disconnected from the universal joint assembly 74. The rod 70 is pivoted about the axis of member 68 to dispose the rod in the phantom line position of FIG. 1, the tractor is backed into the phantom line position of FIG. 1, the plates 86, 88 are connected by bolts 54 to plate 50, the part 78 of power shaft 80 is connected to universal joint assembly 76, and the plow is pushed in the same direction as illustrated in the solid line position of FIGS. 1 and 3, however, the tractor vehicle does not initially move over the area being plowed. The tractor vehicles of the character involved will generally have several reverse speeds (usually of a relatively low gear ratio) however, since relatively deep snow will be encountered, and the blade 57 will be subject to a constant and heavy load, the lower gear ratios available in this attitude of operation will be desirable. When the vehicle is reversed, the power shaft 80 will generally rotate in the direction opposite to that which it rotates when the tractor vehicle moves forwardly, thus the baffle (discharge spout) is disposed in the position for most efficient lateral casting of the snow being plowed.

Obviously, many modifications may be made without departing from the basic spirit of the present invention, and therefore, within the scope of the appended claims the invention may be practised other than has been specifically described.

What I claim is:

1. In a power-operated snow plow for use on a power-supplying draft vehicle and including scraper blades for directing snow toward a central portion, a blade journalled on said plow and disposed in said central portion for casting snow laterally of the normal direction of travel during operation of said plow; the improvement comprising a pair of support sleeves disposed at opposite sides of said plow and mounting means at opposite ends thereof, a power shaft journalled on said plow upon which said blade is mounted, said shaft including coupling means at opposite ends thereof for connection to a power shaft on the draft vehicle, and an adaptor frame including a pair of spaced sleeves, said sleeves including mounting means at one end for detachable connection to said mounting means on said snow plow, said adaptor frame including coupling means for detachable connection on the draft vehicle whereby said plow can be optionally used by mounting said frame forwardly or rearwardly thereof and operating the drafting vehicle in a forward or reverse direction depending upon how said adaptor frame is mounted.

2. The structure as claimed in claim 1 in which said adaptor frame coupling means comprises a pair of coaxial trunnions extending laterally from said frame sleeves, and a coupler disposed above and between said trunnions for connection to a lift link on said draft vehicle.

3. The structure as claimed in claim 1 in which said mounting means on said plow sleeves comprise transverse plates extending between terminal ends of said plow support sleeves, said plates including apertures inwardly of said sleeves, said adaptor frame sleeves telescopically engageable with the terminal ends of said plow sleeves, said adaptor frame including terminally apertured plates extending along the sleeves of said frame and detachably connected to the apertured plates of said plow.

4. The structure as claimed in claim 3 in which said adaptor frame coupling means comprises a pair of coaxial trunnions extending laterally from said frame sleeves, and a coupler disposed above and between said trunnions for connection to a lift link on said draft vehicle.

5. In a power-operated snow plow having a rotary shaft upon which a snow-casting blade is mounted, and means for mounting said snow plow on a draft vehicle having a power take-off connectable to said rotary shaft; the improvement comprising an adaptor frame permitting said snow plow to be dragged due to forward movement of said draft vehicle or pushed due to rearward movement of said vehicle, said frame comprising a pair of spaced parallel sleeves, a U-shaped frame extending vertically from one end of said sleeves, a coupler at a medial upper portion of said U-shaped frame, and a pair of coaxial trunnions extending laterally from lower leg portions of said U-shaped frame, a pair of mounting plates disposed inwardly of the other ends of said sleeves and including transverse apertures for removably receiving connecting elements therethrough.

No references cited.

ABRAHAM G. STONE, *Primary Examiner.*

R. L. HOLLISTER, *Assistant Examiner.*